United States Patent [19]
Francis et al.

[11] Patent Number: 5,047,152
[45] Date of Patent: Sep. 10, 1991

[54] MICROBIAL STABILIZATION AND MASS REDUCTION OF WASTES CONTAINING RADIONUCLIDES AND TOXIC METALS

[75] Inventors: Arokiasamy J. Francis, Middle Island; Cleveland J. Dodge, Wading River; Jeffrey B. Gillow, Valley Cottage, all of N.Y.

[73] Assignee: Associated Universities, Inc., Washington, D.C.

[21] Appl. No.: 608,829

[22] Filed: Nov. 5, 1990

[51] Int. Cl.$^5$ .............................................. C02F 3/34
[52] U.S. Cl. ................................. 210/611; 210/912; 435/252.7; 435/842
[58] Field of Search ............... 210/605, 612, 610, 611, 210/630, 631, 751, 912–914; 435/252.7, 262, 801, 842

[56] References Cited

U.S. PATENT DOCUMENTS

| | | | |
|---|---|---|---|
| 4,511,657 | 4/1985 | Colaruotolo et al. | 210/611 |
| 4,519,912 | 5/1985 | Kauffman et al. | 210/611 |
| 4,519,913 | 5/1985 | Baldwin et al. | 210/611 |
| 4,758,345 | 7/1988 | Francis et al. | 210/611 |
| 4,789,478 | 12/1988 | Revis et al. | 210/611 |

*Primary Examiner*—Thomas Wyse
*Attorney, Agent, or Firm*—Margaret C. Bogosian

[57] ABSTRACT

A process is provided to treat wastes containing radionuclides and toxic metals with Clostridium sp. BFG1 to release a large fraction of the waste solids into solutin and convert the radionuclides and toxic metals to a more concentrated and stable form with concurrent volume and mass reduction. The radionuclides and toxic metals being in a more stable form are available for recovery, recycling and disposal.

8 Claims, 10 Drawing Sheets

MICROBIAL STABILIZATION AND MASS REDUCTION OF WASTES CONTAINING RADIONUCLIDES AND TOXIC METALS

This invention was made with Government support under contract number DE-AC02-76CH00016, between the U.S. Department of Energy and Associated Universities, Inc. The Government has certain rights in the invention.

BACKGROUND OF THE INVENTION

A major national concern is the ability to dispose of wastes containing radionuclides and toxic metals in a safe manner. Large volumes of such wastes are generated by nuclear weapons production facilities, nuclear and fossil fueled power generation plants and the metal fabrication industries. Stabilizing and reducing the mass of the radionuclides and toxic metals contained in such wastes would facilitate their disposal. As used herein, stabilization means the treatment of radionuclides and toxic metals so that they are in a stable or insoluble form and lack the ability to be easily converted chemically or biologically to another soluble form. Examples of radionuclides found in such wastes include uranium, plutonium and thorium; examples of toxic metals include cadmium, cobalt, chromium, copper, lead, zinc, nickel and manganese.

Microorganisms which are ubiquitous throughout nature have long been recognized for their ability to bring about transformations of organic and inorganic compounds. Such microbial processes play a major role in the transformation and transport of radionuclides and toxic metals in nature. Radionuclides and toxic metal compounds in wastes may be present initially as soluble forms or, after disposal, they may be converted to soluble forms by chemical or microbiological processes.

The microbiological reactions include 1) oxidation/reduction, 2) change in pH and Eh which effect the valence state of the metal as well as its solubility characteristics, 3) production of sequestering agents, and 4) bioaccumulation. All of these processes can lead to attenuation or mobilization of metals in the environment.

The predominant forms of toxic metals and radionuclides found in radioactive and fossil-energy wastes can be divided into the following general categories: oxides (simple and complex oxides including ferrites), coprecipitates (metals coprecipitated with oxides of iron, aluminum), carbonate complexes, naturally occurring minerals, and organic and inorganic complexes.

Prior art techniques are known which utilize the recognized in situ microbial action on wastes to direct specific outcomes.

U.S. Pat. No. 3,923,597 to Chakrabarty, et al. describes the binding or biosorption of mercury from an aqueous waste stream by genetically engineered mercury resistant aerobic Pseudomonas species.

U.S. Pat. No. 4,468,461 to Bopp describes a use of aerobic bacteria Pseudomonas fluorescens to reduce chromate from $Cr^{6+}$ to $Cr^{3+}$ in which form the chromium is precipitated from aqueous waste contaminated therewith.

Union of Soviet Socialist Republic patent No. 910,815 describes the extraction of metals such as copper and zinc from ores using specific aerobic acidophilic Thiobacillus ferrooxidans.

Union of Soviet Socialist Republic patent No. 498,338 describes Aerobic bacteria Achromobacter delicatulus being used to solubilize anionic phosphorus from manganese oxide ores due to organic acids produced from metabolism of glucose and other carbon sources.

U.S. Pat. No. 3,266,889 to Duncan, et al. describes a method for extracting metals from sulfide ores using the acidophilic, aerobic bacteria Thiobacillus ferrooxidans. In this process sulfuric acid is generated due to oxidation of sulfur compounds. The sulfuric acid is primarily responsible for solubilization and extraction of metals from ores.

U.S. Pat. No. 4,861,519 to Tusa, et al. describes mass reduction of low activity nuclear power plant wastes by using anaerobic microbes to selectively degrade the organic constituents of the waste leading to the production of methane.

U.S. Pat. No. 4,885,094 to Srinivasan, et al., describes digestion of organic waste, e.g., sewage sludge, by anaerobic microorganisms.

The purpose of the present invention is to improve upon prior art techniques with a biotechnological approach to the clean-up of wastes containing toxic metals and/or radionuclides.

DEPOSIT

The Clostridium microorganism used in the present invention to stabilize and reduce the mass of wastes containing radionuclides and/or toxic metals has been deposited in the American Type Culture Collection prior to the filing date of this application and in accordance with the permanency and accessibility requirements of the U.S. Pat. and Trademark Office. The following information pertains to that deposit:

| Microorganism Scientific Description | Applicant' Reference | ATCC Designation |
| --- | --- | --- |
| Clostridium sp | BFG1 | 55102 |

SUMMARY OF THE INVENTION

Figure 1:
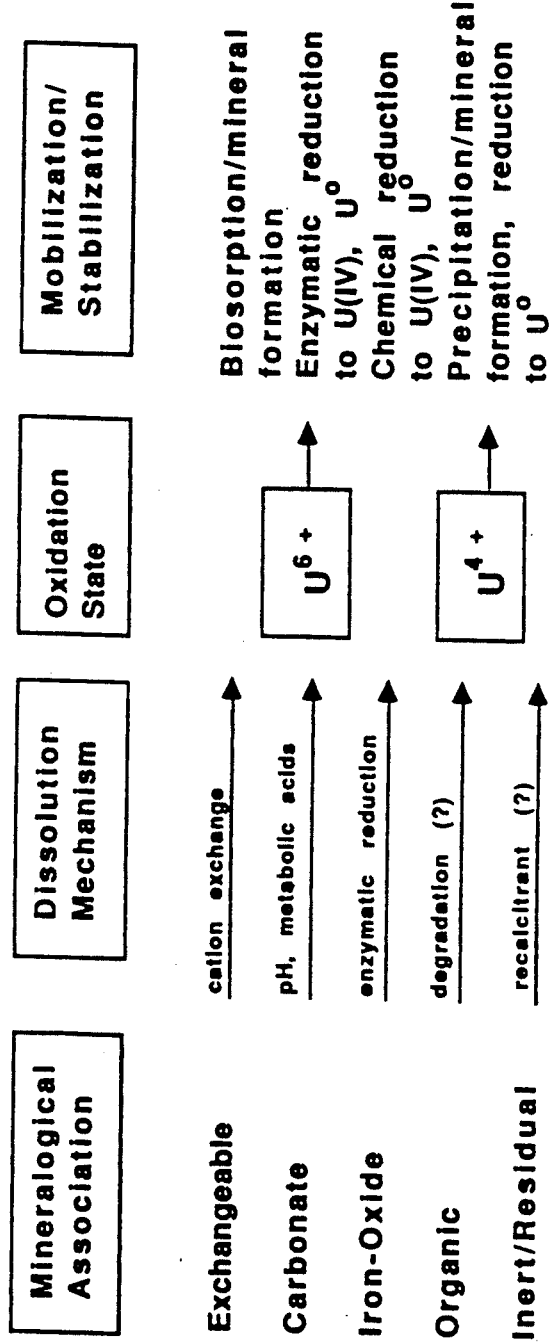
FIG. 1 depicts the mechanisms by which the instant process results in the precipitation of uranium.

A method is provided for microbially treating sludges, sediments, mixed wastes and similar waste medium that contain radionuclides and/or toxic metals (all hereinafter referred to as "wastes") to allow the mass of the waste to be reduced and the radionuclides and toxic metals contained therein to be chemically converted to a more stable form. Reducing the mass and to a lesser extent the volume of the fraction of the waste containing the radionuclides and toxic metals means that more material can be stored or disposed of in a smaller volume, can be handled easier and can be transported or chemically treated easier. Changing the radionuclides and toxic metals to a more stable form allows the material to be easily chemically processed or disposed of in shallow or deep subsurface geological formations where the material is less susceptible to chemical change or transport.

In this invention, wastes contaminated with radionuclides and/or toxic metals which may or may not contain indigenous bacteria are treated with an anaerobic microorganism from the clostridium genus to reduce the mass of the wastes and convert the radionuclides and toxic metals in the wastes to a chemically and biologically stable form. This microbial treatment of such wastes results in a waste that is less susceptible to environmental contamination and can be disposed of more economically due to its reduction in mass and to some extent its reduction in volume. Such treatment results in the direct enzymatic reduction of the radionuclides and toxic metals as well as indirect chemical dissolution of toxic and non-toxic elements through production of organic acid metabolites under the anaerobic conditions.

Anaerobic microbe Clostridium sp. BFG1 is used in the waste treatment process of the present invention. This microbe, in the presence of metabolizable nutrients, carbon and nitrogen, solubilizes large volumes of carbonates and also causes changes in the valence states of the radionuclides and toxic metals in the wastes. The microbial activity causes release of such radionuclides and toxic metals into the medium. For example, metals and radionuclides associated with the carbonate fraction are solubilized along with the carbonate during microbial treatment due to indirect action, i.e. production of organic acid metabolites and lowering the pH of the medium. Metals and radionuclides initially associated with the iron oxide fraction are solubilized due to direct microbial enzymatic reduction of iron. The released metals and radionuclides are then reduced to lower oxidation states, by enzymatic action, become insoluble, and precipitate out of the solution. This process results in enrichment of radionuclides and toxic metals in the waste. Decrease in mass of the waste occurs because the microbial action causes the dissolution of carbonates, reduction of iron and release of other innocuous compounds all of which go into solution and are decanted off.

DETAILED DESCRIPTION OF THE INVENTION

The present invention relates to a method of treating wastes containing radionuclides and/or toxic metals, found in solution or a precipitate, to allow the separation and the consequent removal of carbonates, iron oxides and other organic and inorganic materials from the original medium, leaving a reduced mass of waste in which the radionuclides and toxic metals were redistributed in other mineralogical fractions to more stable forms. The removal of carbonates, iron and other materials from the original waste medium provides a means of reducing the mass of the waste as well as converting the radionuclides and toxic metals into a more stable form.

It is therefore an object of this invention to present a novel process to cause the reduction in mass of wastes while causing the radionuclides and/or toxic metals in the same wastes to be converted to a solid form which is chemically and biologically stable and available for further recovery and recycling or appropriate disposal.

The present invention provides a process for microbially treating wastes containing radionuclides and/or toxic metals. This process involves first adding to said waste a supplemental source of metabolizable nutrient carbon and nitrogen. The waste is then treated with a bacterial culture that contains the anaerobic bacterium Clostridium sp. BFG1 grown to logarithmic growth phase (24 hr old culture). The treatment is conducted at temperatures around 20° to 30° C. under anaerobic conditions in the presence of a nitrogen atmosphere, for 5 to 15 days. Clostridium sp. BFG1 is first grown to logarithmic growth phase (24 hr old culture) in a conventional growth medium. The bacterial culture containing the clostridium organisms is added to the waste sample along with deionized water to which has been added the carbon nutrient source and the nitrogen source. The preferred carbon nutrient sources are sugars, most preferred being glucose, and molasses. The preferred nitrogen source is ammonium chloride. This microbial treatment causes the radionuclides and toxic metals in the waste to precipitate out in a stable and solid form leaving a liquid which is free of radionuclides and toxic metals.

Clostridium sp. BFG1 when added along with a supplemental carbon and nitrogen source to the waste containing radionuclides and/or toxic metals following this process will by their biological action cause the toxic metals and radionuclides to become chemically and biologically stable in the remaining waste while releasing most carbonates, Fe—Mn oxides, and organic materials into the solution thus reducing the overall mass of the waste.

Clostridium sp. BFG1 is first grown in a standard growth medium preferably containing about 0.5% by weight of glucose and 0.015% by weight of ammonium chloride to logarithmic growth phase and added to waste to which deionized water and supplemental sources of carbon and nitrogen are added and the resulting treated waste sample is mixed directly and incubated under anaerobic conditions in order to solubilize and subsequently precipitate the stabilized radionuclides and toxic metals. Bacterial contact may be in a batch process or in a continuous fluidized process. Either process must be carried out in an enclosure suitable to exclude oxygen to allow anaerobic conditions. With most waste types, the efficiency of the process is increased by using a continuous culture process.

The anaerobic bacterium Clostridium sp. BFG1 seeks energy by metabolizing the carbon source and at the same time causes change in the valence states of redox active metals it contacts. In the present invention the bacterial treatment causes release of carbonate and iron complexes into solution with concomitant changes in the valence states of the radionuclides and heavy metals found in the waste. The production of organic acid metabolites by action of the bacteria changes the pH of the solution causing the radionuclides and toxic metals to go into solution and then precipitate out in a stable form. Being in a stable form means the radionuclides and toxic metals are much less likely to experience further change from chemical or biological attack. The carbonates and iron and other non-toxic metals released by the bacterial actions remain in solution. FIG. 1 depicts the mechanisms by which the instant process results in the precipitation of one radionuclide, uranium.

The following examples are illustrative of the present invention.

EXAMPLE 1

Preparation of the Bacterial Culture

A. Composition of Medium for Clostridium sp. BFG1 culture. Glucose-ammonium-glycerol phosphate buffered growth medium:

| | |
|---|---|
| Glucose | 5 g |
| $NH_4Cl$ | 0.5 g |
| Glycerol Phosphate | 0.3 g |
| $MgSO_4 \cdot 7H_2O$ | 0.2 g |
| $FeSO_4 \cdot 7H_2O$ | 2.5 mg |
| $CaCO_3$ | 20 g |
| Peptone | 0.1 g |
| Yeast extract | 0.1 g |
| Distilled $H_2O$ | 1000 ml |
| pH | 8.10 |

B. Prereduce growth medium by boiling and purging with $N_2$ gas. Dispense 40 ml into 60 ml or 15 ml into 25 ml serum bottles with swirling to maintain mixture of $CaCO_3$. Stopper and autoclave. Inoculate with a young culture of Clostridium sp. BFG1 (1 ml per 40 ml of medium) and incubate at 24° C. under anaerobic conditions. The microorganism is grown to logarithmic growth phase (approximately $1.0 \times 10^9$ cells/ml).

C. The waste sample to be treated is then innoculated with the bacterial culture. Deionized water is added to the waste sample together with sources of carbon and nitrogen nutrients. The metabolizable carbon source is added to the waste sample in concentrations of about 0.1% to 10% by weight to volume. The nitrogen source is added to the waste sample in concentrations of about 0.01% to 5% by weight to volume. The preferred growth culture contains glucose as the carbon source at 0.5% by weight to volume and $NH_4Cl$ as the nitrogen source at 0.5% by weight to volume. Approximately 1 to 5% by volume of bacterial culture is added to the waste sample to which 0.5% carbon source and 0.015% nitrogen source has been added. The microbial treatment is conducted under anaerobic conditions in the presence of nitrogen atmosphere at a temperature in the range of about 20° C. to 30° C. for a period of from 5 to 15 days.

EXAMPLE 2

Characterization of Waste Samples

Waste Samples

A sediment sample from the New Hope Pond (NHP sediment), which received uranium processing wastes, and a sludge sample from the uranium process waste stream after denitrification of high nitrate containing uranium waste at the West End Treatment facility (WETF sludge), both at the U.S. Department of Energy, Oak Ridge Y-12 plant, Oak Ridge, Tenn., were used as the sample sludge and sediment in the following experimental descriptions. The samples were collected in 2.5 gallon polyethylene containers equipped with airtight seals, and shipped to Brookhaven National Laboratory in 55 gallon drums. The samples were mixed well, and sub-samples were taken for chemical and microbiological analyses. A portion of the sediment and sludge samples were freeze-dried. The remaining samples in the polyethylene containers were tightly sealed and stored in the refrigerator.

Chemical Characterization

The sediment and sludge samples were analyzed for moisture by drying overnight at 105° C. Ash and sulfate sulfur were determined according to ASTM methods D3174-82 and D2492-80, respectively. After samples were treated with 1N $HNO_3$, and gently heated to remove free carbonates the carbon and nitrogen were determined using a Perkin Elmer model 240B elemental analyzer. The metals Al, As, Ca, Cd, Cr, Co, Cu, Fe, K, Mg, Mn, Na, Ni, Pb, Se and Zn were analyzed by atomic absorption spectroscopy. Uranium was analyzed by spectrophotometric method using bromo-PADAP reagent after a preliminary extraction with tri-n-octyl-phosphine oxide in cyclohexane. Mercury was determined by cold vapor lamp method. An initial screening of the samples for the presence of various metals was performed by using X-ray fluorescence beam line X-26 at the National Synchrotron Light Source (NSLS).

The mineralogical association of uranium in the sediment and sludge samples was determined by a selective extraction procedure. This included determinations of water soluble, exchangeable, carbonate, iron-manganese oxide, organic, inert, and residual fractions. Blanks containing no sediment or sludge sample were carried through each extraction step.

The chemical characteristics of the sediment and sludge samples are given in Table 1. The NHP sediment had a high ash content, and appreciable amounts of organic carbon and nitrogen. X-ray diffraction analysis of the sediment sample revealed that it contained high levels of $SiO_2$. The WETF sludge was low in organic carbon and nitrogen but high in ash and sulfate. The sulfate in the sludge resulted from the

TABLE 1

Characterization of Sediment and Sludge Samples

| Constituents | Contaminated Pond Sediment From New Hope Pond | Sludge From The Denitrification Process of Uranium Processing |
|---|---|---|
| Physical, % | | |
| moisture | 64.5 | 63.1 |
| ash | 75.5 | 58.7 |
| Chemical, % | | |
| Organic carbon | 11.3 | 1.22 |
| Nitrogen | 0.42 | 0.11 |
| Sulfate sulfur | 0.92 | 2.32 |
| Major Metals, % | | |
| aluminum | 5.08 | 5.26 |
| calcium | 4.66 | 36.4 |
| iron | 4.72 | 0.47 |
| magnesium | 0.79 | 0.49 |
| potassium | 1.19 | 0.05 |
| sodium | 0.09 | 1.87 |
| Trace metals, ug/g dry wt | | |
| arsenic | 18.7 | 1.2 |
| cadmium | 17.6 | 80.6 |
| chromium | 357 | 450 |
| cobalt | 81.3 | 38.7 |
| copper | 457 | 392 |
| lead | 155 | 360 |
| manganese | 726 | 209 |
| mercury | 323 | 9.6 |
| nickel | 202 | 1200 |
| selenium | <1 | <1 |
| uranium | 923 | 3080 |
| zinc | 1400 | 703 | addition of sulfuric acid and ferric sulfate in the waste treatment process.

Both sediment and sludge samples contained varying levels of major elements, Al, Ca, Fe, Mg, K, and Na, and toxic metals, As, Cd, Cr, Co, Cu, Pb, Mn, Hg, Ni, Se, U and Zn (Table 1). The concentrations of uranium in sediment and sludge samples were 923 and 3080 ppm, respectively. The sediment contained high levels of Cr, Cu, Mn, Hg, and Zn. Compared to the sediment, the sludge was high in Ca, low in Fe and Mn, and contained higher amounts of Cd, Cr, Pb and Ni. Analysis of the sediments sample by X-ray fluorescence showed, in addition to those elements reported in Table 1, the presence of titanium, gallium, bromine, strontium, rubidium, yttrium, and zirconium.

Chemical analysis of the supernates of the NHP sediment and WETF sludge is shown in Table 2.

TABLE 2

Chemical Characterization of Sediment and Sludge Supernates[a]

| | Pond sediment | Sludge |
|---|---|---|
| pH | 7.25 | 9.25 |
| DIC $\mu g/ml$ | 50 | 334 |
| DOC $\mu g/ml$ | 113 | <5 |
| $NO^-_3$ $\mu g/ml$ | 0.33 | 14.5 |
| $SO_4$ $\mu g/ml$ | 180 | 1480 |
| $Cl^-$ $\mu g/ml$ | 29.9 | 732 |

[a]Supernate removed from sediment or sludge after settling and filtered.

The WETF sludge supernate pH was alkaline, high in dissolved inorganic carbon (DIC) and sulfate and low in nitrate. The sediment supernate pH was near neutral and contained high dissolved organic carbon (DOC), and low levels of other constituents tested.

Figure 2:
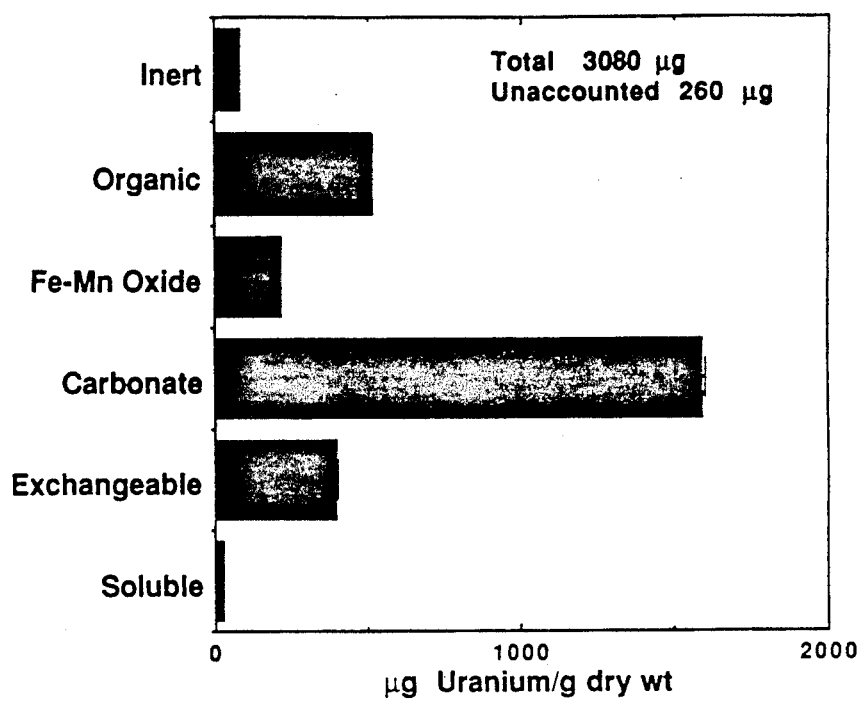
FIG. 2 is bar chart showing the characterization of uranium in a contaminated sludge in terms of micrograms of uranium per gram of dry weight of sludge. The characterization is in terms of the amount of uranium in inert, organic, Fe—Mn oxide, carbonate, exchangeable and soluble forms.

Nearly half the total uranium in the sludge sample (FIG. 2) was associated with the carbonate fraction (1600 g). The association of uranium with other fractions was as follows: exchangeable, 400 micrograms; iron oxide, 216 micrograms; organic, 516 micrograms; and inert, 80 micrograms/g dry wt.

EXAMPLE 3

Anaerobic microbial activity

As used in the examples that follow, the term "control sample" refers to a waste sample that has been autoclaved to destroy the indigenous bacteria; the terms "unamended sample" and "untreated sample" refer to a waste sample in which the indigenous bacteria are still viable; and the terms "amended sample" and "treated sample" refer to a waste sample in which the indigenous bacteria are still viable that has been treated with the clostridium bacterial culture and the supplemental carbon and nitrogen according to the process of the present invention.

Anaerobic microbial activity measurements for the sediment and sludge samples are presented in Table 3. The amended samples were treated according to the procedures described in Example 1.

The unamended samples showed no significant microbial activity except for small amounts of methane in the headspace of the sediment sample. No organic acid production was observed in the unamended samples. The amended samples, however, showed an increase in total gas, $CO_2$, $H_2$, $CH_4$, and organic acids. The pH of the amended sediment and the sludge samples was lowered by about 2.3 and 2.5 units, respectively. This change in pH was due to the production of organic acid metabolites from glucose fermentation. The organic acids consisted of acetic, butyric, propionic, formic, pyruvic, lactic, isobutyric, valeric, and isocaproic acids. The amended sludge sample produced higher amounts of total gas and $CO_2$ which was due to the dissolution of $CaCO_3$ in the sludge. Methane production in the amended sludge was much lower than in the sediment. Decrease in sulfate concentrations was observed only in amended sludge and sediment samples (data not shown); the formation of sulfides (blackening of waste) was not evident.

EXAMPLE 4

Anaerobic Dissolution of Uranium and Toxic Metals from Sediment and Sludge

To determine the extent of dissolution of uranium due to microbial treatment following the process of the present invention, 5 g of the sediment or sludge was added to 160 ml acid washed sterile serum bottles and then placed inside an anaerobic glove box filled with $N_2$. Deionized water with and without glucose and $NH_4Cl$ were prereduced by boiling for 15 min. while purging with $N_2$ (99.99% purity). The deionized water samples were transferred to the anaerobic glove box, cooled, and then dispensed into the serum bottles containing sludge or sediment. One hundred milliliters of prereduced deionized water or deionized water containing glucose and nitrogen was added to the samples, and the bottles were then sealed with butyl rubber stoppers. The waste sample with

TABLE 3

| | Metabolic Activity of Indigenous Bacteria in Sediment and Sludge | | | | | |
|---|---|---|---|---|---|---|
| Treatment[a] | pH | Total Gas Produced (ml) | $CO_2$ (mmoles) | $H_2$ (mmoles) | $CH_4$ (mmoles) | Total[b] Organic Acids (moles) |
| NHP Sediment | | | | | | |
| Unamended | 7.47 | 2.0 | 0.08 | 0.01 | 1.6 | ND |
| Amended | 5.22 | 26.2 | 2.7 | 0.20 | 20.6 | 4490 |
| WETF Sludge | | | | | | |
| Unamended | 8.82 | 1.2 | 0.61 | ND | 0.05 | ND |
| Amended | 6.38 | 41.2 | 4.7 | 0.34 | 0.18 | 3970 |

[a]Sediment incubated for 50 days, sludge incubated for 51 days
[b]Organic acid metabolites consisted of acetic, butyric, propionic, formic, pyruvic, lactic, isobutyric, valeric and isocaproic acids
[c]ND - none detected
[d]± 1 SEM deionized water, glucose and $NH_4Cl$ was then innoculated with the Clostridium sp. BFG1 culture. The treatment consisted of (i) waste sample plus deionized water (unamended), (ii) waste sample plus bacterial culture plus deionized water containing 0.5% glucose and 0.015% $NH_4Cl$ (amended), and (iii) control (autoclaved) waste sample with deionized water. All samples were incubated at 24° C. in triplicate except the control samples, which were incubated in duplicate. At periodic intervals, unamended, amended, and the control samples were analyzed for total gas production, carbon dioxide, hydrogen, and methane. The samples were then opened inside the anaerobic glove box, and after measuring pH, the samples were filtered using a 0.22 micrometer Millex filter. A portion of the filtered aliquot was analyzed for anions by ion chromatography using a conductivity detector, for organic acid metabolites by HPLC using a UV detector at 210 nm, and for alcohols and glucose by HPLC using a refractive index detector. A portion of the aliquot was acidified with Ultrex $HNO_3$, and analyzed for uranium and toxic metals as described above.

Figure 3:
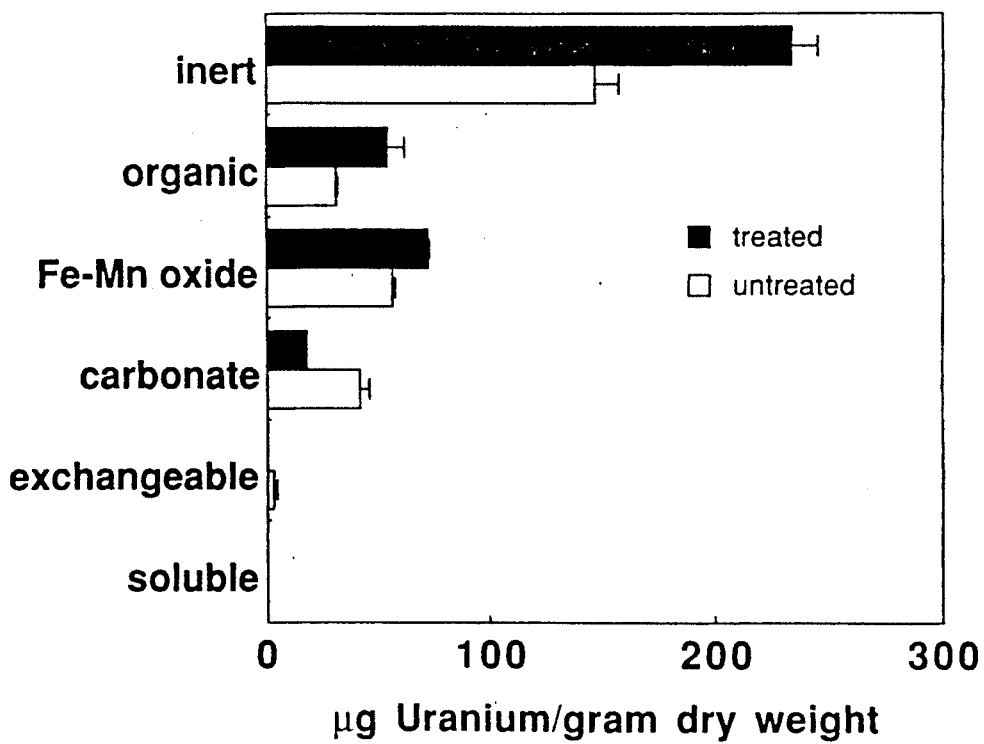
FIG. 3 is a bar chart showing the mineralogical association of uranium in sediment in terms of micro grams of uranium per gram of dry weight of sediment. The figure shows the amount of uranium in inert, organic, Fe—Mn oxide, carbonate, exchangeable, and water soluble forms present before and after treatment with anaerobic bacteria according to the process of the present invention.
Figure 4:
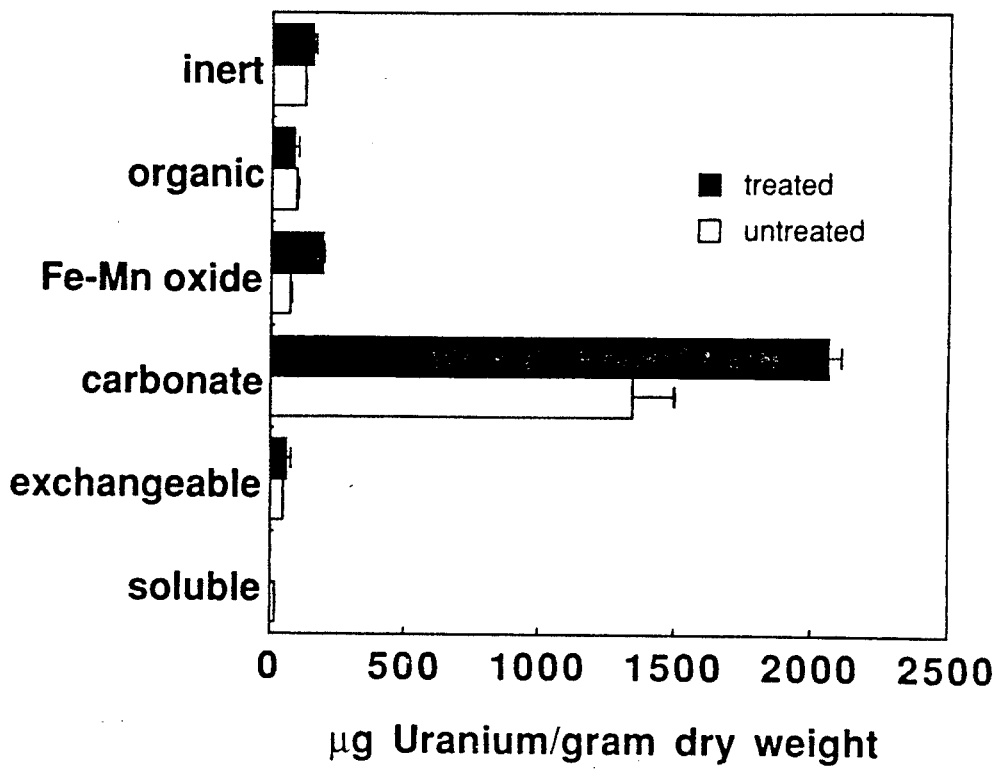
FIG. 4 is a bar chart showing the mineralogical association of uranium in sludge in terms of micrograms of uranium per gram of dry weight of sludge. The figure shows the amount of uranium in inert, organic, Fe—Mn oxide, carbonate, exchangeable, and water soluble forms present before and after treatment with anaerobic bacteria according to the process of the present invention.

The mineralogical association of uranium in the sediment sample is shown in FIG. 3. The mineralogical association of uranium in the sludge sample is shown in FIG. 4. The inert (predominantly silicates) and organic fractions contained 301 and 295 microgram/g of uranium, dry wt, respectively, while the carbonate fraction contained 176 microgram/g of uranium, and the Fe—Mn oxide fraction contained 162 microgram uranium/g dry wt.

Figure 5:
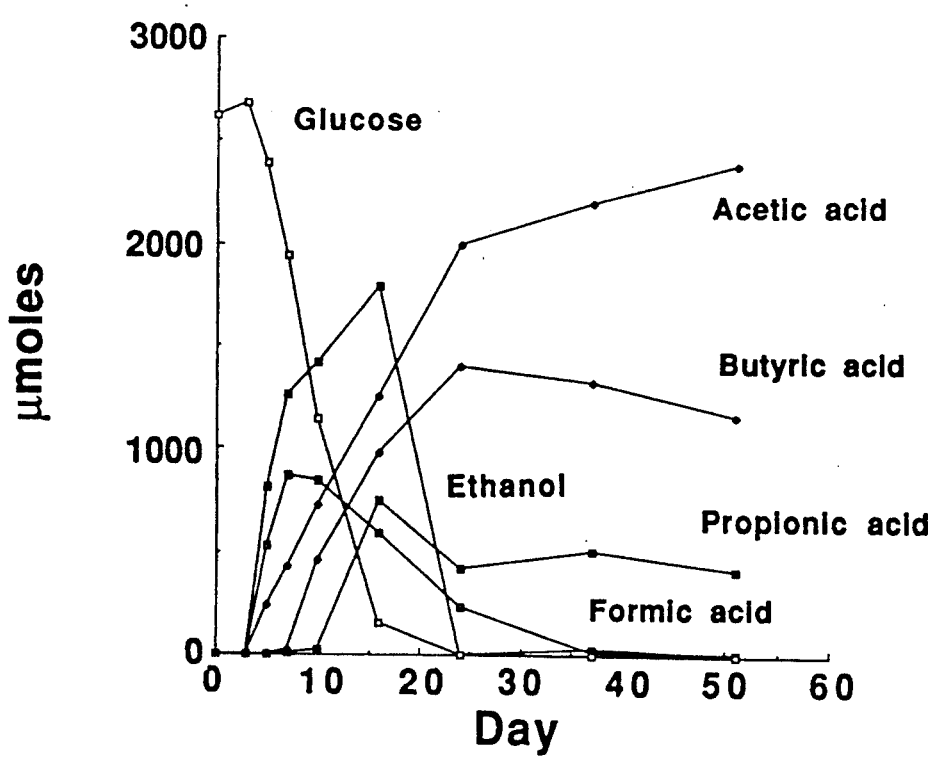
FIG. 5 is a line graph showing the microbial metabolites plotted in terms of micromoles as function of time in days.

The microbial metabolites developed in sludge over a 50 day period are shown in FIG. 5.

Figure 6:
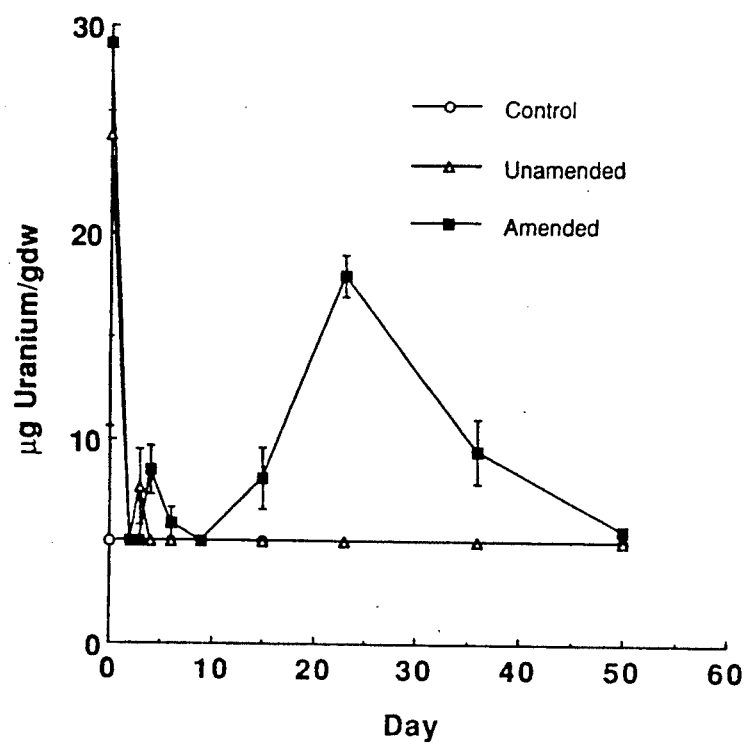
FIG. 6 is a line graph of the dissolution of uranium from New Hope Pond ("NHP") sediment incubated under anaerobic conditions. The sample concentration in terms of micrograms of uranium per gram of dry weight of sediment is plotted as a function of time.

Dissolution of uranium from the sediment incubated under anaerobic conditions is presented in FIG. 6. Both the control and the unamended sediment samples incubated for 50 days under anaerobic conditions showed no increase of uranium in solution. The concentration of uranium decreased in the amended sample from 30 micrograms per gram at day 0 to below detection limit at day 2, followed by a slight increase on day 4, and decreased to below the detection limit on day 9. A gradual increase in uranium to 18 microgram per gram was observed on day 23, followed by a gradual decrease to below the detection level on day 50. Analysis of the residue in the sample bottle after 50 days incubation showed that about 83% of the total uranium was recovered.

Figure 7:
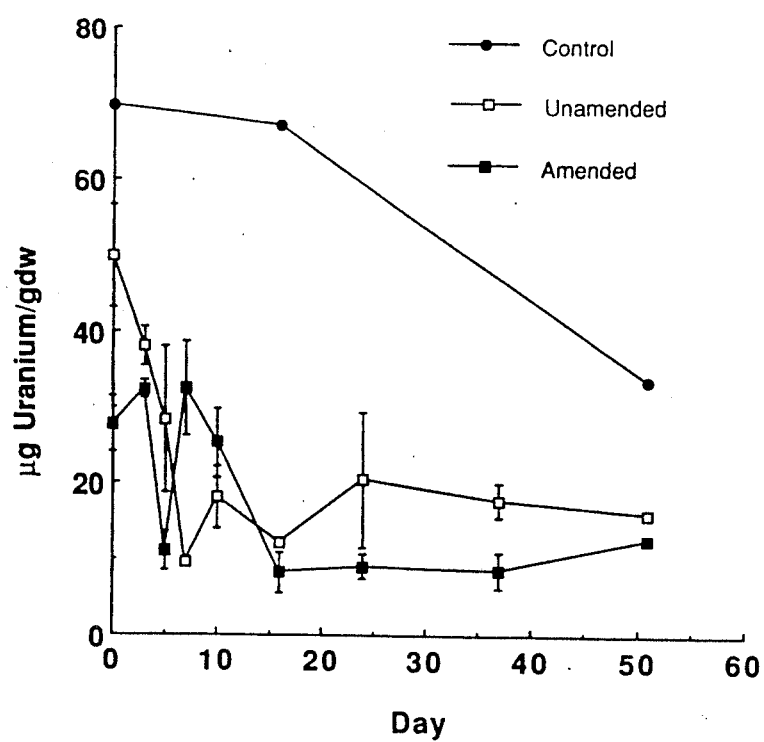
FIG. 7 is a line graph of the dissolution of anaerobically incubated uranium sludge from the West End Treatment Facility (WETF) at the Department of Energy Y-12 plant in Oak Ridge, Tenn. The sample concentrations are plotted in terms of micrograms of uranium per gram of dry weight of sludge as a function of time in days.

The dissolution profile of uranium from the sludge is shown in FIG. 7. The uranium in the autoclaved control sample showed a gradual decrease from the initial 70 micrograms per gram to 34 micrograms per gram on day 51. The higher concentration of uranium observed in the control sample may be due to the autoclaving process. Uranium in the unamended sample also decreased during the course of incubation from 50 micrograms per gram to 16 micrograms per gram. In the amended sample, however, uranium concentration in solution decreased below that of the control and the unamended samples. The only exception to the above observation was on days 7 and 10, wherein the uranium values were slightly higher than that of the unamended sample but much less than that of the autoclaved control sample. A comparison of uranium in the sludge before and after microbial treatment showed that all of the uranium was found in the solids.

Figure 8:
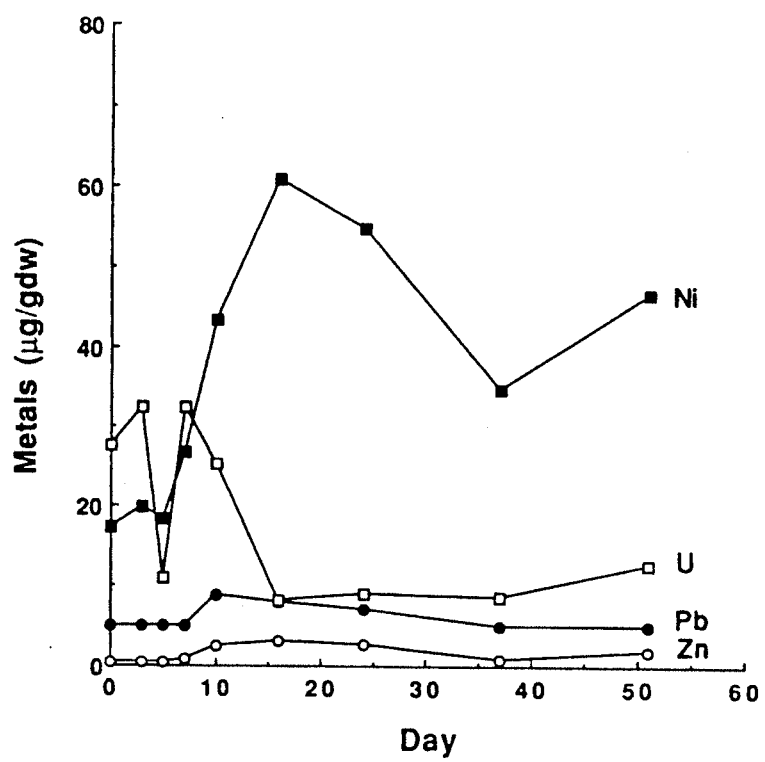
FIG. 8 is a line graph of the anaerobic microbial a dissolution of toxic metals from WETF sludge. The concentration of toxic metals is given in terms of micrograms per gram of dry weight of sludge plotted as a function of time in days.
Figure 9:
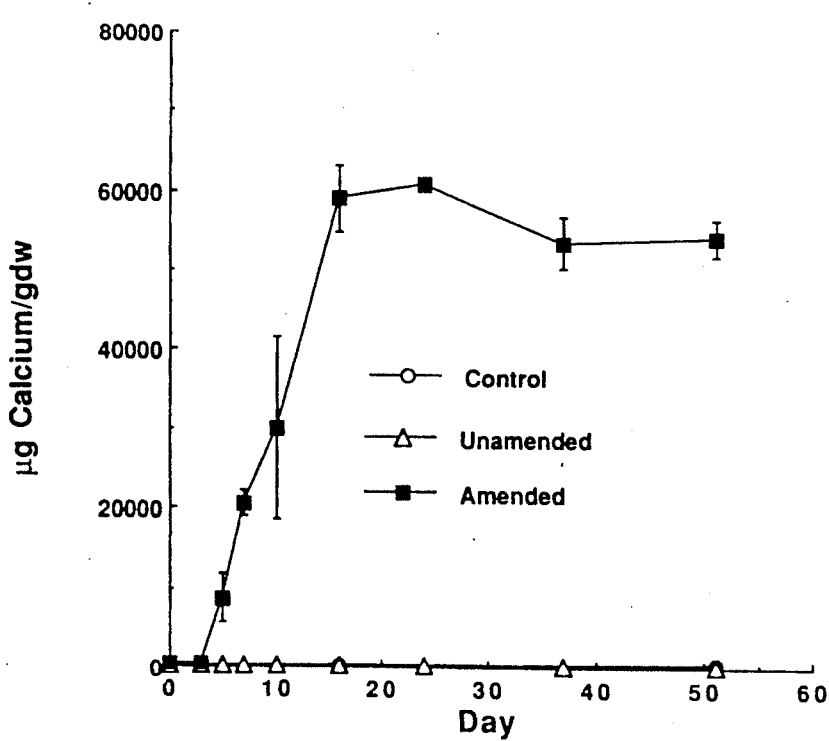
FIG. 9 is a line graph of the anaerobic microbial dissolution of calcium from WETF sludge. The concentration of calcium is given in terms of micrograms per gram of dry weight of sludge plotted as a function of time in days.
Figure 10:
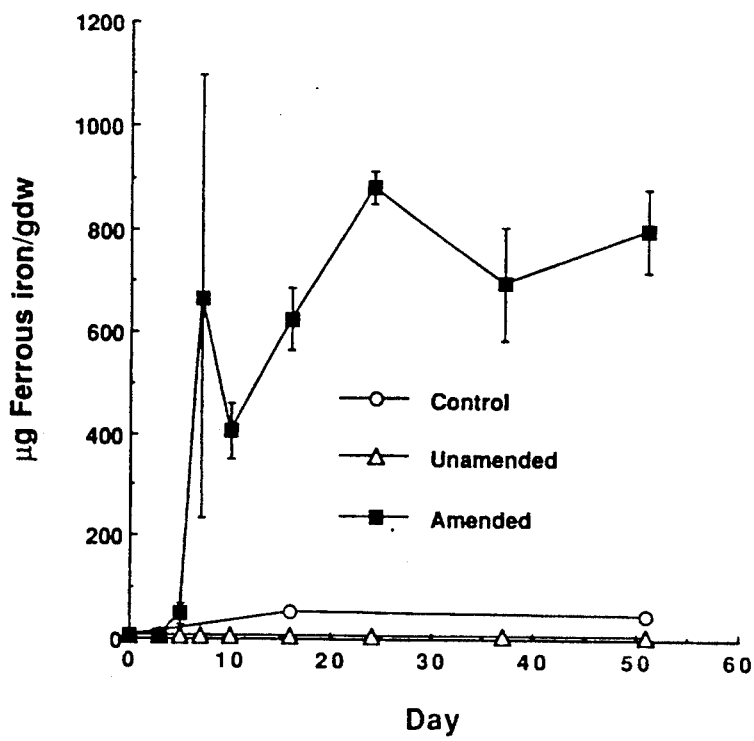
FIG. 10 is a line graph of the anaerobic microbial dissolution of iron from WETF sludge. The concentration of iron is given in terms of micrograms per gram of dry weight of sludge plotted as a function of time in days.

Similar results were obtained for sludge with dissolution of toxic metals (see FIG. 8), calcium (see FIG. 9), and iron (see FIG. 10).

Figure 11:
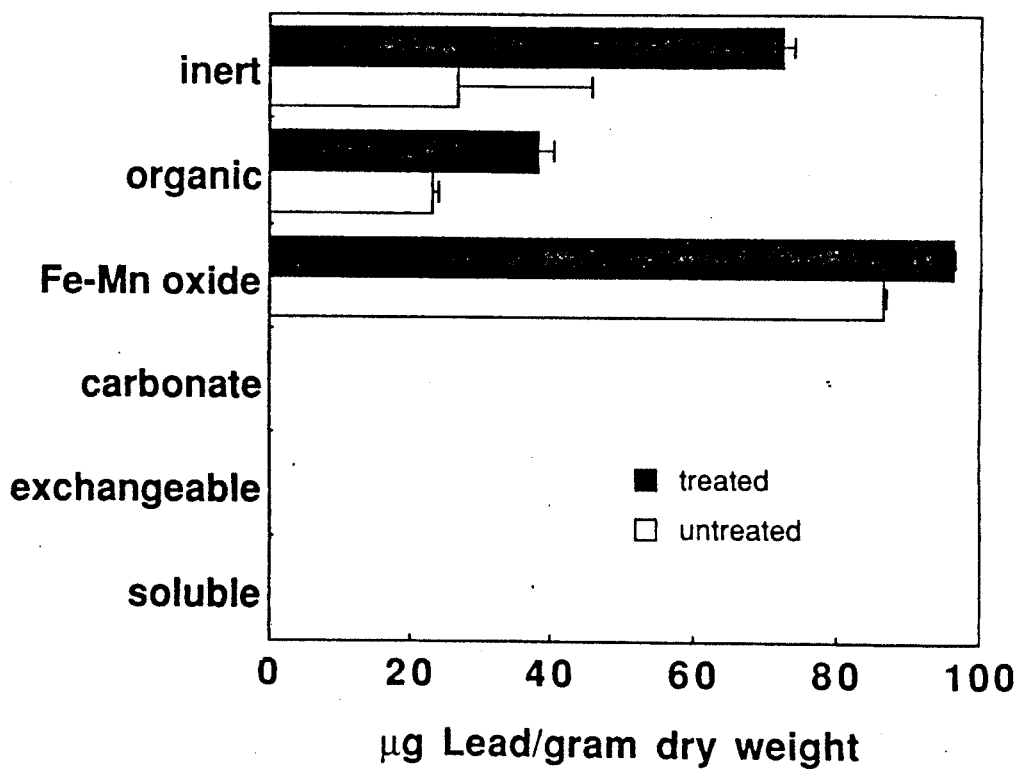
FIG. 11 is a bar chart showing the mineralogical association of lead in sediment in terms of micrograms per gram of dry weight of sediment. The figure shows the amount of lead in inert, organic, Fe—Mn oxide, carbonate, exchangeable, and water soluble forms present before and after treatment with anaerobic bacteria according to the process of the present invention.
Figure 12:
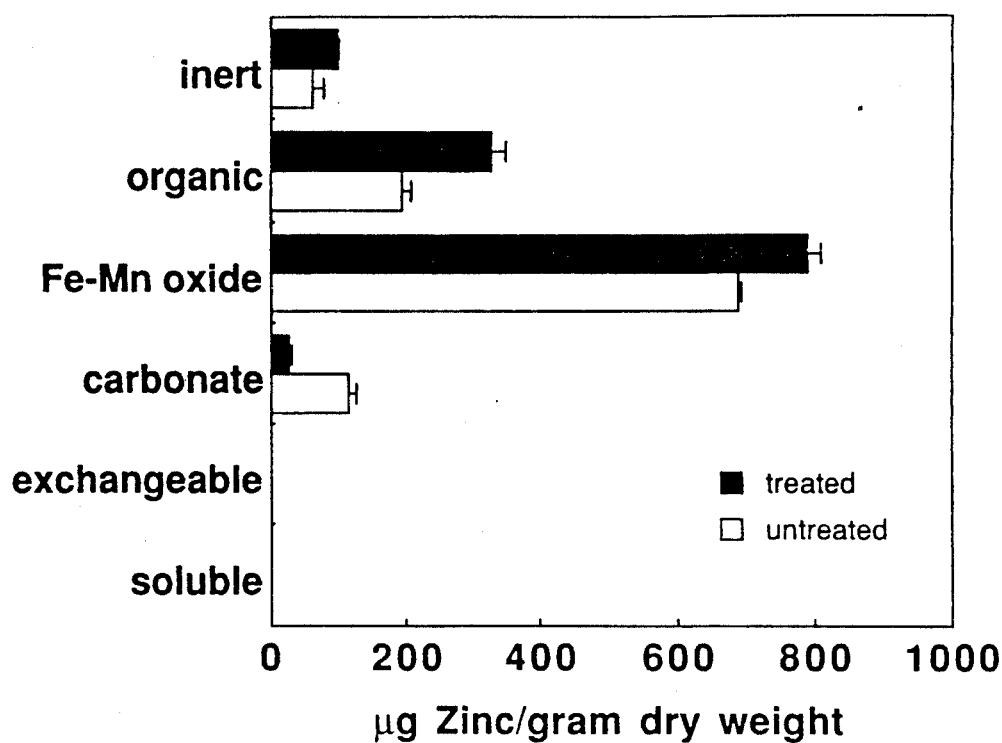
FIG. 12 is a bar chart showing the mineralogical association of zinc in sediment in terms of micrograms of zinc per gram of dry weight of sediment. The figure shows the amount of zinc in inert, organic, Fe—Mn oxide, carbonate, exchangeable, and water soluble forms present before and after treatment with anaerobic bacteria following the process of the present invention.
Figure 13:
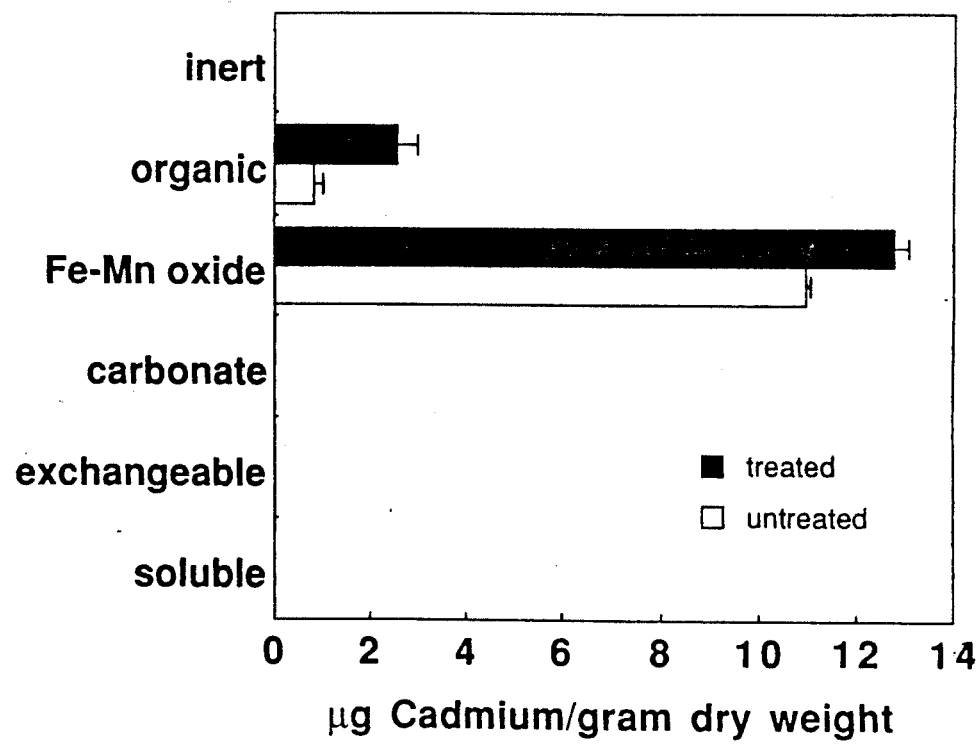
FIG. 13 is a bar chart showing the mineralogical association of cadmium in sediment in terms of micrograms of cadmium per gram of dry weight of sediment. The figure shows the amount of cadmium in inert, organic, Fe—Mn oxide, carbonate, exchangeable, and water soluble forms present before and after treatment with anaerobic bacteria following the process of the present invention.
Figure 14:
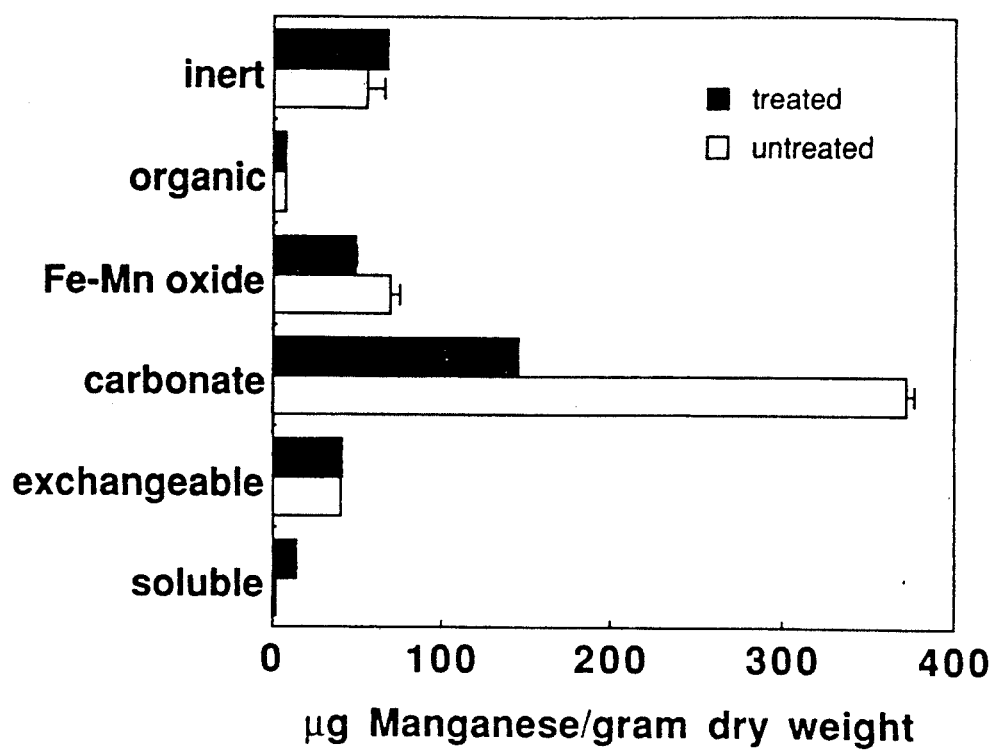
FIG. 14 is a bar chart showing the mineralogical association of manganese in sediment in terms of micrograms of manganese per gram of dry weight of sediment. The figure shows the amount of manganese in inert, organic, Fe—Mn oxide, carbonate, exchangeable, and water soluble forms present before and after treatment with anaerobic bacteria following the process of the present invention.
Figure 15:
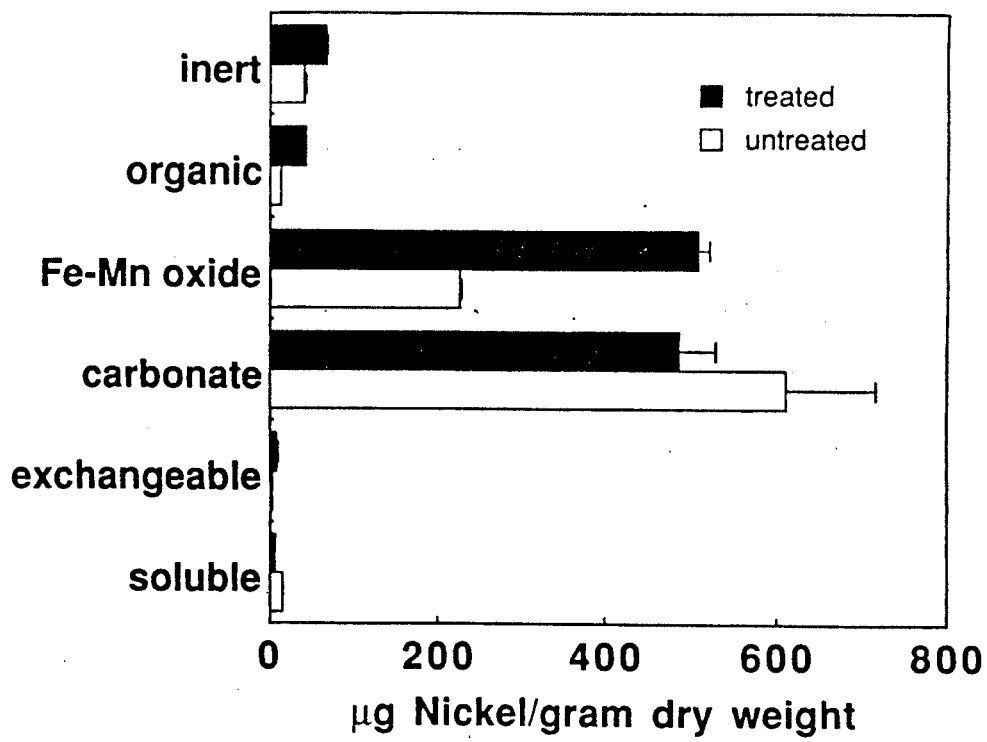
FIG. 15 is a bar chart showing the mineralogical association of nickel in sludge in terms of micrograms of nickel per gram of dry weight of sludge. The figure shows the amount of nickel in inert, organic, Fe—Mn oxide, carbonate, exchangeable, and water soluble forms present before and after treatment with anaerobic bacteria following the present process.
Figure 16:
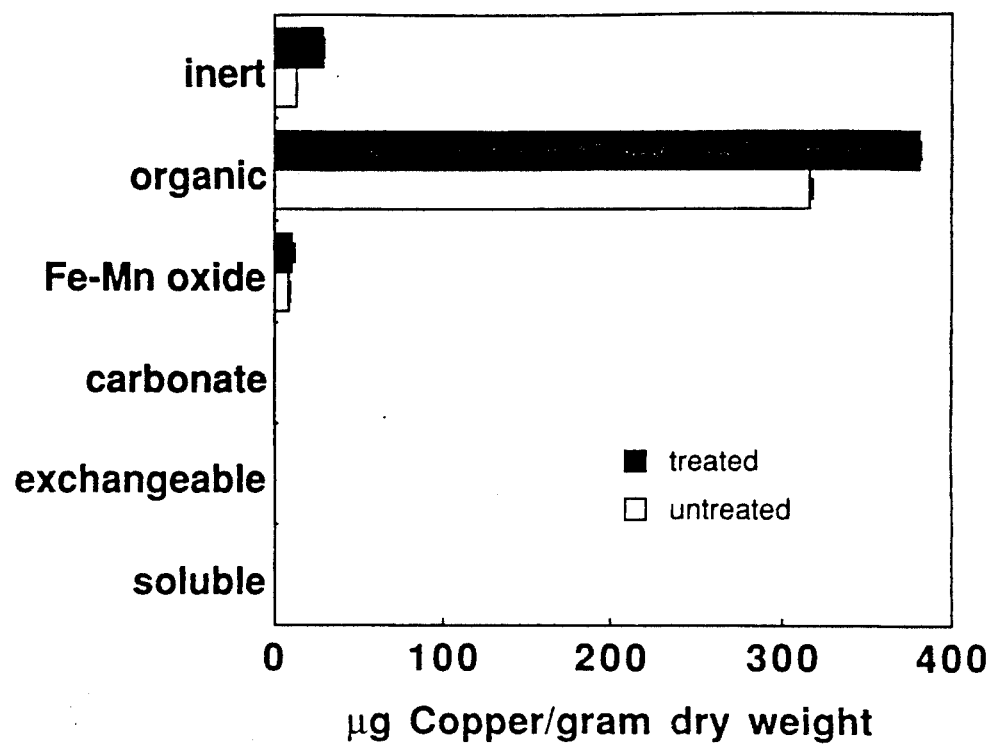
FIG. 16 is a bar chart showing the mineralogical association of copper in sludge in terms of micrograms of copper per gram of dry weight of sludge. The figure shows the amount of copper in inert, organic, Fe—Mn oxide, carbonate, exchangeable, and water soluble forms present before and after treatment with anaerobic bacteria following the present process.
Figure 17:
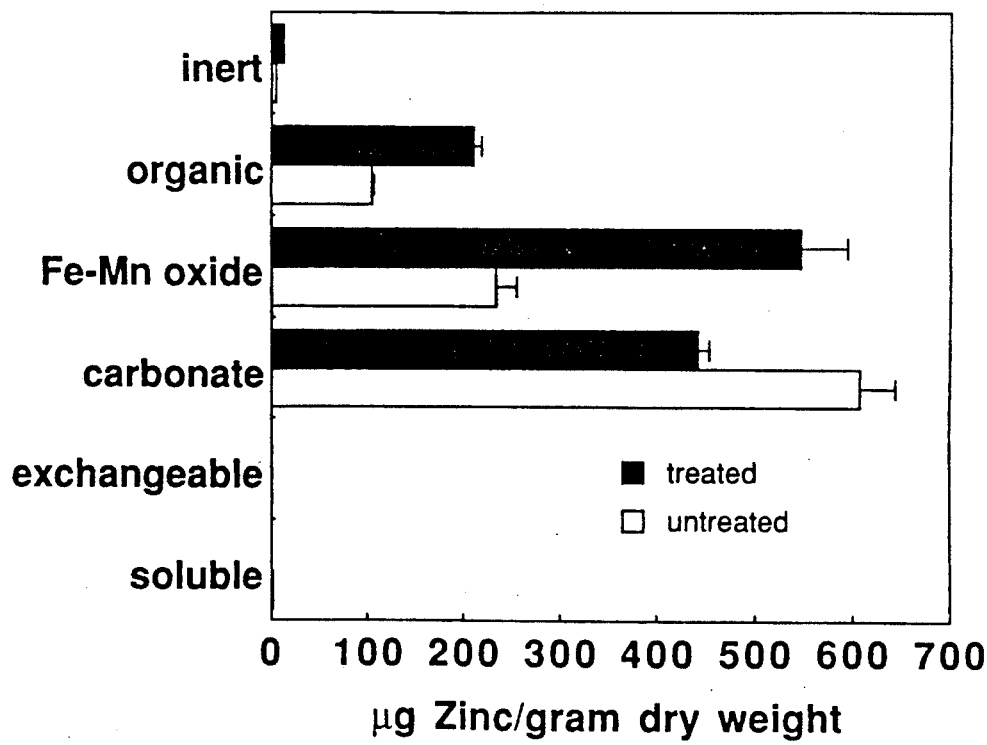
FIG. 17 is a bar chart showing the mineralogical association of zinc in sludge in terms of micrograms of zinc per gram of dry weight of sludge. The figure shows the amount of zinc in inert, organic, Fe—Mn oxide, carbonate, exchangeable, and water soluble forms present before and after treatment with anaerobic bacteria following the present process.

The result of the microbial action can be evaluated by reviewing the mineralogical association of sediment treated with the clostridium microorganism following the process of the present invention versus untreated sediment for uranium (FIG. 3), lead (FIG. 11), zinc (FIG. 12), cadmium (FIG. 13), manganese (FIG. 14), and for microbially treated sludge versus untreated sludge for uranium (FIG. 14), nickel (FIG. 15), copper (FIG. 16), and zinc (FIG. 17).

Figure 18:
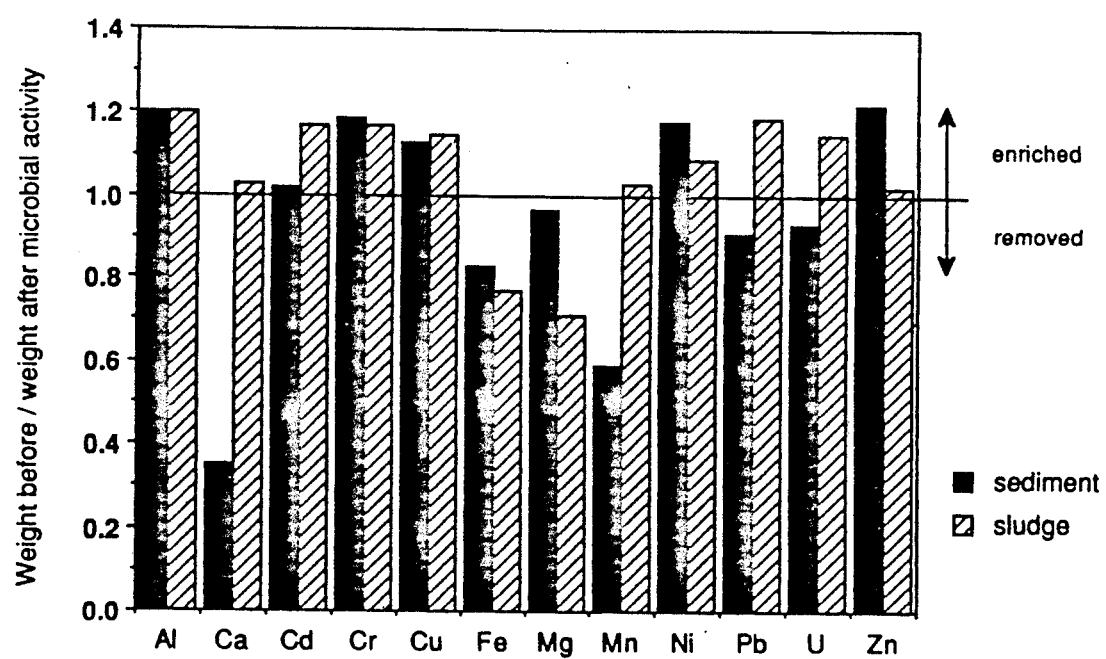
FIG. 18 is a bar chart showing the enrichment factor for radionuclides and toxic metals in wastes treated with an anaerobic culture. The bar chart shows the enrichment factor for 12 metals in sediment and sludge plotted in terms of metal weight before microbial activity divided by the metal weight after microbial activity. The ratio of radionuclides or toxic metals before treatment divided by radioactive or toxic metals after treatment would be "one" if the treatment caused no change. If the fraction is greater than "one" the fraction would indicate the percent of increase in the solid precipitate for that metal. This graph provides the result of batch process following the present process.

The enrichment factor for radionuclides and toxic metals in sediment and sludge, treated with the clostridium microorganism following the instant process, is shown in FIG. 18. FIG. 18 shows a ratio of solid waste before treatment to waste after treatment. If the ratio is greater than 1, the percent of mass increase in the waste solids equals the amount greater than one.

The net reduction of the mass of the waste sample due to the anaerobic bacterial treatment following the instant process in batch culture is shown in Table 4 which follows.

TABLE 4

| Sample | Untreated Dry Weight (g) | Treated Dry Weight (g) | Weight Loss (%) |
|---|---|---|---|
| Sediment | 2.12 + 0.02 | 1.90 + 0.01 | 10.2 + 0.7 |
| Sludge | 2.20 + 0.03 | 1.87 + 0.04 | 14.7 + 0.7 |

The dissolution of major metals in waste samples following the microbial treatment of the present invention is shown in Table 5.

TABLE 5

| Sample | Treatment | mg/gram dry weight | | | |
|---|---|---|---|---|---|
| | | Al | Ca | Fe | Mg |
| Sediment | None | <.025 | 0.567 ± 0.010 | 0.024 ± 0.000 | 0.125 ± 0.003 |
| | Treated | <.025 | 26.0 ± 1.0 | 12.5 ± 0.1 | 1.34 ± 0.04 |
| Sludge | None | <.025 | 0.180 ± 0.027 | <0.005 | 0.240 ± 0.003 |
| | Treated | <.025 | 49.0 ± 7.4 | 0.966 ± 0.011 | 5.40 ± 0.08 |

[Ca, Fe, Mg extensively solubilized by bacteria; Al not solubilized.]

The dissolution of toxic metals in waste samples following the microbial treatment of the present invention is shown in Table 6.

TABLE 6

| Sample | Treatment | ug/gram dry weight | | | | | | | |
|---|---|---|---|---|---|---|---|---|---|
| | | Cd | Cr | Cu | Mn | Ni | Pb | U | Zn |
| Sediment | None | <1 | <2 | <1 | 3.64 ± 0.18 (0.5) | <2 | <2 | <5 | <0.5 |
| | Treated | <1 | <2 | <1 | 299 ± 6 (48) | 10.5 ± 0.6 (6) | <2 | <5 | 1.14 ± 0.0 (<1) |
| Sludge | None | <1 | <2 | <1 | <1 | 17.6 ± 0.0 (1) | <2 | <5 | 1.24 ± 0.34 (<1) |
| | Treated | <1 | <2 | <1 | 19.9 ± 1.0 (8) | 69.9 ± 2.0 (5) | <2 | <5 | 10.8 ± 0.4 (1) |

( ) = % of total

We claim:

1. A process for reducing the mass of wastes containing radionuclides and/or toxic metals which comprises treating such wastes under anaerobic conditions at elevated temperatures with an aqueous bacterial culture containing Clostridium sp. BFG1 and supplemental sources of metabolizable carbon and nitrogen.

2. The process of claim 1 wherein the microbial treatment is conducted at a temperature in the range of 20° C. to 30° C.

3. The process of claim 1 wherein the supplemental source of metabolizable carbon is glucose.

4. The process of claim 1 wherein the supplemental source of nitrogen is NH$_4$Cl.

5. A process for stabilizing the radionuclides and/or toxic metals contained in contaminated wastes which comprises treating such wastes under anaerobic conditions at elevated temperatures with an aqueous bacterial culture containing Clostridium sp. BFG1 and supplemental sources of metabolizable carbon and nitrogen.

6. The process of claim 5 wherein the microbial treatment is conducted at a temperature in the range of 20° C. to 30° C.

7. The process of claim 5 wherein the supplemental source of metabolizable carbon is glucose.

8. The process of claim 5 wherein the supplemental source of nitrogen is NH$_4$Cl.

* * * * *